US008972665B2

(12) United States Patent
Prasky et al.

(10) Patent No.: US 8,972,665 B2
(45) Date of Patent: Mar. 3, 2015

(54) CACHE SET SELECTIVE POWER UP

(75) Inventors: Brian R. Prasky, Wappingers Falls, NY (US); Anthony Saporito, Highland, NY (US); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/524,574

(22) Filed: Jun. 15, 2012

(65) Prior Publication Data

US 2013/0339596 A1    Dec. 19, 2013

(51) Int. Cl.
G06F 1/32        (2006.01)
G06F 21/81       (2013.01)
G06F 17/30       (2006.01)

(52) U.S. Cl.
CPC ........ G06F 1/3275 (2013.01); *G06F 17/30982* (2013.01)
USPC .......................................... 711/128; 711/108

(58) Field of Classification Search
CPC . G06F 9/3806; G06F 12/0862; G06F 9/3867; G06F 12/1027; G06F 9/3802; G06F 9/3885; G06F 9/383; G06F 9/3844
See application file for complete search history.

(56) References Cited

U.S. PATENT DOCUMENTS

| | | | |
|---|---|---|---|
| 5,530,822 A * | 6/1996 | Beavers et al. | ............... 711/207 |
| 6,678,815 B1 | 1/2004 | Mathews et al. | |
| 7,165,169 B2 | 1/2007 | Henry et al. | |
| 7,899,993 B2 | 3/2011 | Knoth | |
| 2004/0030838 A1 | 2/2004 | van de Waerdt | |
| 2007/0124538 A1 | 5/2007 | Abadeer et al. | |
| 2008/0040547 A1 | 2/2008 | Abadeer et al. | |
| 2008/0065833 A1 * | 3/2008 | Hosoki et al. | ................. 711/130 |
| 2008/0216073 A1 * | 9/2008 | Yates et al. | .................... 718/100 |
| 2010/0064123 A1 | 3/2010 | Zuraski, Jr. et al. | |
| 2011/0219190 A1 * | 9/2011 | Ng et al. | ........................ 711/122 |
| 2011/0283124 A1 * | 11/2011 | Branover et al. | ............. 713/323 |
| 2012/0096295 A1 * | 4/2012 | Krick | ............................. 713/324 |
| 2012/0216002 A1 * | 8/2012 | Moyer et al. | ................... 711/163 |

OTHER PUBLICATIONS

Cocke, et al., "Branch-Processing Instruction Cache", Original Publication Date: Jun. 1, 1986, ip.com; www.ip.com; 4 pages.
IBM, Storing multiple under-utilized cache blocks in one physical cache line, original publication date: Nov. 28, 2006, ip.com; www. ip.com; 6 pages.

(Continued)

*Primary Examiner* — Matthew Bradley
*Assistant Examiner* — Candice Rankin
(74) *Attorney, Agent, or Firm* — Cantor Colburn LLP; Margaret McNamara (57) ABSTRACT

Embodiments of the disclosure include selectively powering up a cache set of a multi-set associative cache by receiving an instruction fetch address and determining that the instruction fetch address corresponds to one of a plurality of entries of a content addressable memory. Based on determining that the instruction fetch address corresponds to one of a plurality of entries of a content addressable memory a cache set of the multi-set associative cache that contains a cache line referenced by the instruction fetch address is identified and only powering up a subset of cache. Based on the identified cache set not being powered up, selectively powering up the identified cache set of the multi-set associative cache and transmitting one or more instructions stored in the cache line referenced by the instruction fetch address to a processor.

15 Claims, 7 Drawing Sheets

(56) References Cited

OTHER PUBLICATIONS

Inoue et al, "Way-Predicting Set-Associative Cache for High Performance and Low Energy Consumption", Department of Computer Science and Communication Engineering, Kyushu University, 1999, pp. 1-3.
Jones et al., "Instruction Cache Energy Saving Through Compiler Way-Placement", Mar. 2008, 6 pages.
Ma et al., "Way Memoization to Reduce Fetch Energy in nstruction Caches", MIT Laboratory for Computer Science, Jun. 2001, pp. 1-8.
Tang et al., "Integrated i-cache Way Predictor and Branch Target Buffer to Reduce Energy Consumption", 2002, Department of Information and Computer Science, pp. 1-8.
Van Fleet, et al., "Automatic Cache Line Access Monitoring", Original Publication Date: Jun. 1, 1994, ip.com; www.ip.com; 3 pages.
Zhang, et al., "Previsiting tag and keep way history to reduce power in instruction cache"; Acta Electronica Sinica; vol. 32; No. 8; pp. 1286-1289; Aug. 2004.
English Abstract of Article Zhang et al., "Previsiting tag and keep way history to reduce power in instruction cache"; Acta Electronica Sinica; vol. 32; No. 8; pp. 1286-1289; Aug. 2004, 1 page.

* cited by examiner

FIG. 7

CACHE SET SELECTIVE POWER UP

BACKGROUND

The present invention relates generally to reducing power consumption in a processor, and more specifically, to reducing power consumption due to cache accesses in a processor.

Processors generally include one or more cache memories to allow faster access to frequently used instructions and data. Commonly, such caches include both an instruction cache and a data cache. A cache normally includes a tag array containing the address tags of cached information and a data array containing the cached information. Each time data is fetched from the cache, power is consumed.

The presence or absence of instructions and/or data in a processor cache memory has a significant impact on the processor performance as the execution speed of the processor decreases dramatically if instructions and/or data have to be fetched from the main memory. Accordingly, even though only a small number of cache lines are required to execute the majority of instructions required by a software program within a processor, instruction caches are typically configured to be multi-set associative to reduce the amount of cache misses.

In general, the multi-set associativity of the cache increases the power consumption of the cache because the multiple sets of the cache are typically accessed in parallel to increase the performance, by reducing the access latency, of multi-set associative caches, even though the desired instruction or data is only located in one of the sets. By simultaneously accessing each of the cache sets, significant power is wasted by unnecessarily accessing cache sets that do not contain the desired instruction or data. As more and more processing cores are placed on a chip, the amount of performance throughput per watt continues to increase and the power associated with cache associativity becomes more and more expensive.

SUMMARY

Embodiments include a computer program product, computer implemented method, and computer system for selectively powering up a cache set of a multi-set associative cache. The method includes receiving an instruction fetch address and determining that the instruction fetch address corresponds to one of a plurality of entries of a content addressable memory. Based on determining that the instruction fetch address corresponds to one of a plurality of entries of a content addressable memory a cache set of the multi-set associative cache that contains a cache line referenced by the instruction fetch address is identified and only powering up a subset of cache. Based on the identified cache set not being powered up, selectively powering up the identified cache set of the multi-set associative cache and transmitting one or more instructions stored in the cache line referenced by the instruction fetch address to a processor.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiment are apparent from the following detailed description taken in conjunction with the accompanying drawings in which:

DETAILED DESCRIPTION

In exemplary embodiments, methods, systems and computer program products are provided for tracking the instruction cache set associated with a limited number of instructions, or cache lines, such that only one cache set within the instruction cache needs to be powered up to retrieve an instruction. In exemplary embodiments, by selectively powering up only one cache set, the performance of cache remains constant while the overall power decreases. In many applications, when the size of a cache is doubled the miss rate drops by the $\sqrt{2}$ (the square root of two). Accordingly, a majority of cache accesses can be covered by a small finite amount of references to a number (N) of the last cache lines referenced. By tracking the set associated with each of the N last cache lines referenced, only those fetches which are not to the N last cache lines referenced need to power up the cache in its entirety.

Figure 1:
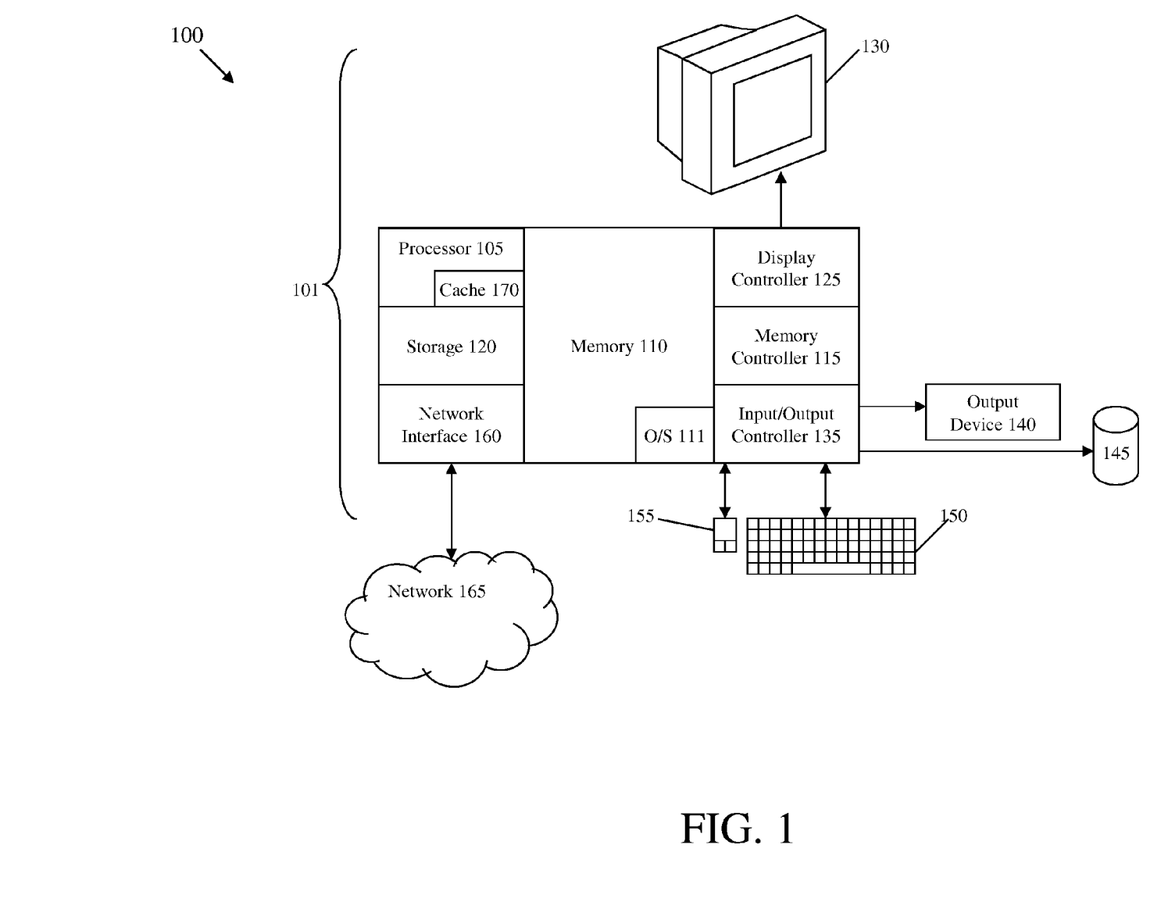
FIG. 1 illustrates a block diagram of a system in accordance with an exemplary embodiment.

FIG. 1 illustrates a block diagram of a system 100 for selectively powering up a cache set. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

Figure 2:
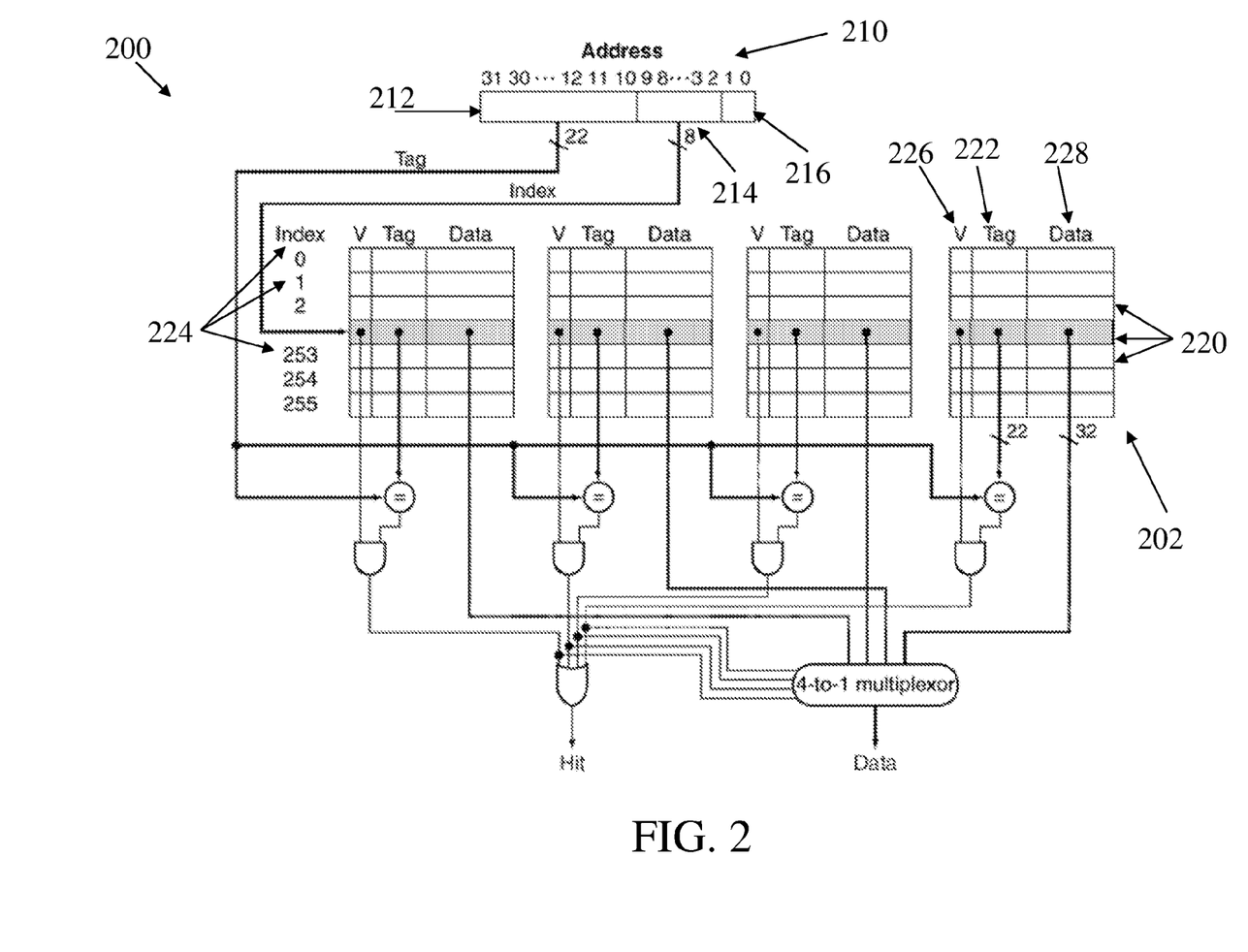
FIG. 2 depicts a schematic of diagram of a four way set associative cache in accordance with an embodiment.

Referring now to FIG. 2, a diagram illustrating a four-way set associative cache 200 in accordance with an exemplary embodiment is shown. As illustrated, the four-way set associative cache 200 includes four cache sets 202. Information stored within the cache sets 202 are accessed using an address 210, which includes a tag 212, an index 214 and an offset 216. Each cache set 202 includes a plurality of cache lines 220 that each includes an index 224, a tag field 222 that stores physical address bits or tags and a data field 228 that stores blocks of data and/or instructions. In addition, each cache line 220 has an associated valid bit 226. The tag field 222 and valid bit 226 of each set can be described to comprise a structure called the directory which is physically separate from the structure that holds the data field 228. In exemplary embodiments, a particular index 214 of address 206 points to a corresponding index 224 of a cache line 220 in each of the cache sets 202. In order to determine whether a particular instruction is stored in a particular cache set 202, tag 212 of address 206 is compared to the tags stored in the tag fields 222 of the corresponding cache lines 220 of each the cache set 202. Accordingly, to retrieve an instruction and/or data from the four-way set associative cache 200 with as minimal latency as possible, each cache set 202 must be accessed. Since accessing each cache set 202 requires power, accessing all four cache sets in parallel wastes power by unnecessarily accessing cache sets 202 that do not contain the desired instruction or data.

Figure 3:
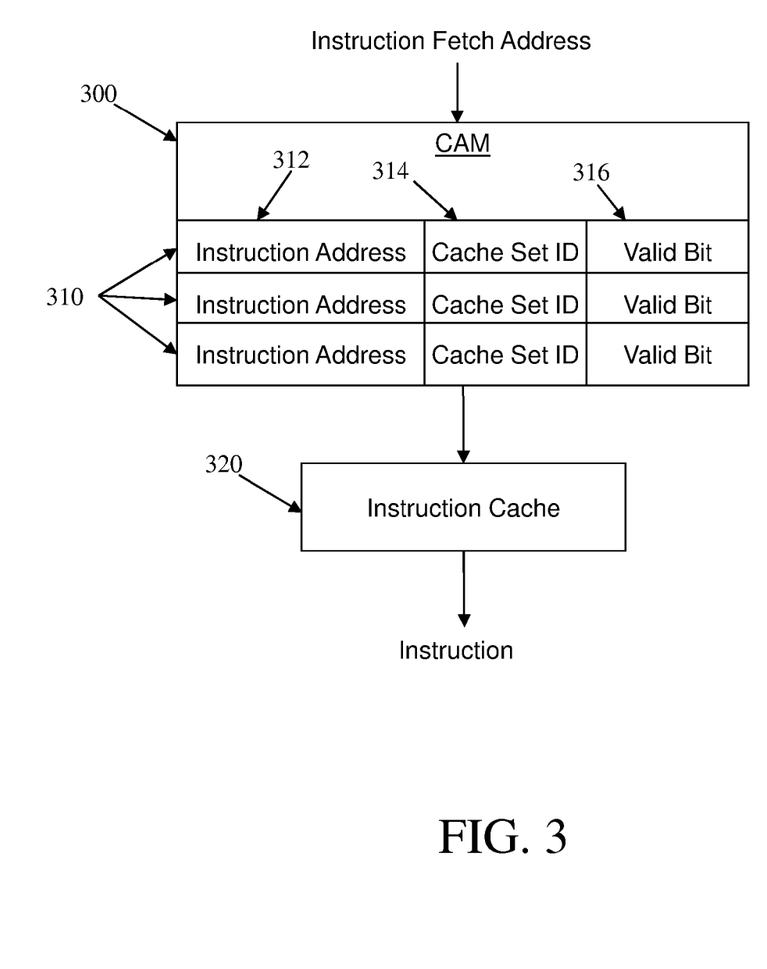
FIG. 3 depicts a block diagram of a system for selectively powering up a cache set of a multi-set associative cache in accordance with an embodiment.

Turning now to FIG. 3, a block diagram of a system for selectively powering up a cache set of a multi-set associative cache in accordance with an exemplary embodiment is shown. As illustrated, the system includes a content addressable memory (CAM) 300 and an instruction cache 320. The CAM 300 is configured to receive an instruction fetch address and to determine if the CAM 300 includes an entry that corresponds to the instruction fetch address. If the CAM 300 includes an entry that corresponds to the instruction fetch address, the set within the cache that contains the instruction corresponding to the instruction fetch address is determined and only the identified set of the instruction cache is required to be powered up to retrieve the instruction.

In exemplary embodiments, the CAM 300 includes a plurality of entries 310. In one embodiment, the CAM 300 may be configured to include sixteen entries 310 that contain the sixteen most recent unique instruction cache lines referenced. Each entry 310 corresponds to a unique instruction cache line and includes an instruction address field 312 that includes the address of the instruction cache line, a set field 314 that includes the set within the instruction cache that contains the instruction cache line, and a valid bit field 316. In exemplary embodiments, the information corresponding to an instruction cache line is only placed into an entry 310 of the CAM 300 if the instruction text is contained in the instruction cache. Furthermore, when the entry 310 is placed into the CAM 300, the valid bit field 316 of the entry 310 is set to a TRUE, or a value of one, and the instruction cache set which contains the instruction cache line is recorded in the set field 314 of the entry 310.

In exemplary embodiments, the CAM 300 is configured to include a fixed number of entries 310 that are configured to store the most recently referenced instruction cache lines. Accordingly, when a newly referenced instruction cache line is encountered one of the current entries 310 of the CAM 300 may need to be removed. In exemplary embodiments, the CAM 300 may use a round-robin or least recently used (LRU) replacement scheme to determine which entry 310 to remove. In alternative exemplary embodiments, the CAM may use a least frequently used replacement scheme to determine which entry 310 to remove.

In exemplary embodiments, when an instruction cache line is invalidated or replaced in the instruction cache 320, the instruction cache line may correspond to an entry 310 in the CAM 300, which must also be invalidated in the CAM 300. In exemplary embodiments, the CAM 300 may invalidate an entry 310 by setting the valid bit 316 of the entry 310 to a FALSE, or zero value. In exemplary embodiments, the CAM 300 may be configured to use a replacement scheme to determine which entry 310 to remove. For example, the CAM 300 may first remove any entries 310 that have a FALSE valid bit 316 and when there are no entries 310 with a FALSE valid bit 316 the least recently used entry 310 will be removed.

In exemplary embodiments, operations that invalidate the instruction cache line must also invalidate at least the corresponding entries 310 in the CAM 300 and potentially the entire CAM 300. Since the CAM 300 has less address and address translation information compared to a real or absolute address based directory that is accompanied by a translation lookaside buffer (TLB), the CAM 300 requires clearing more broadly than the clearing that occurs on the directory. For example, whenever the virtual address translation state changes, the real or absolute address based directory of the instruction cache does not have to be cleared, but the entire CAM 300 may need to be invalidated.

Figure 4:
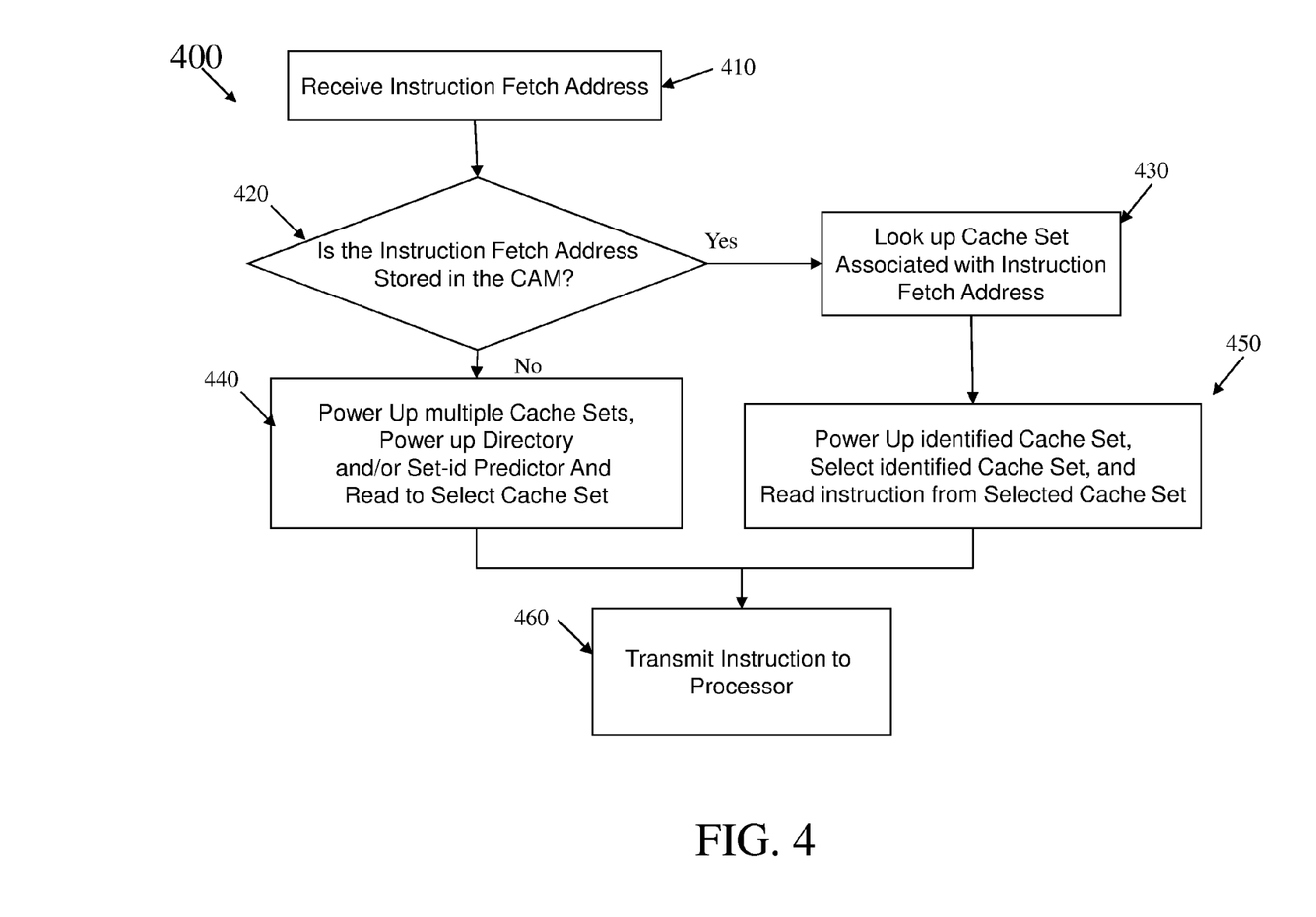
FIG. 4 depicts a process flow for selectively powering up a cache set of a multi-set associative cache in accordance with an embodiment.

Referring now to FIG. 4 a process flow for a method of selectively powering up a cache set of a multi-set associative cache in accordance with an embodiment is shown. As shown at block 410, the method includes receiving an instruction fetch address. Next, as shown at block 420, the method includes determining if the instruction fetch address corresponds to an entry in the CAM. If the instruction fetch address corresponds to an entry in the CAM, the method proceeds to block 430 and looks up the cache set associated with the instruction fetch address. Next, as shown at block 450, the identified cache set is powered up, the identified cache set is selected, and the instruction is read from the line of the selected set. If the instruction fetch address does not correspond to an entry in the CAM, the method proceeds to block 440 and all of the cache sets are powered up. In addition, any other arrays and structures (the directory and set-id predictor for example) that are required for determining which set is to be selected are also powered up, read, and compared and a cache set is selected. The method concludes at block 460 by transmitting the instruction to the processor.

Figure 5:
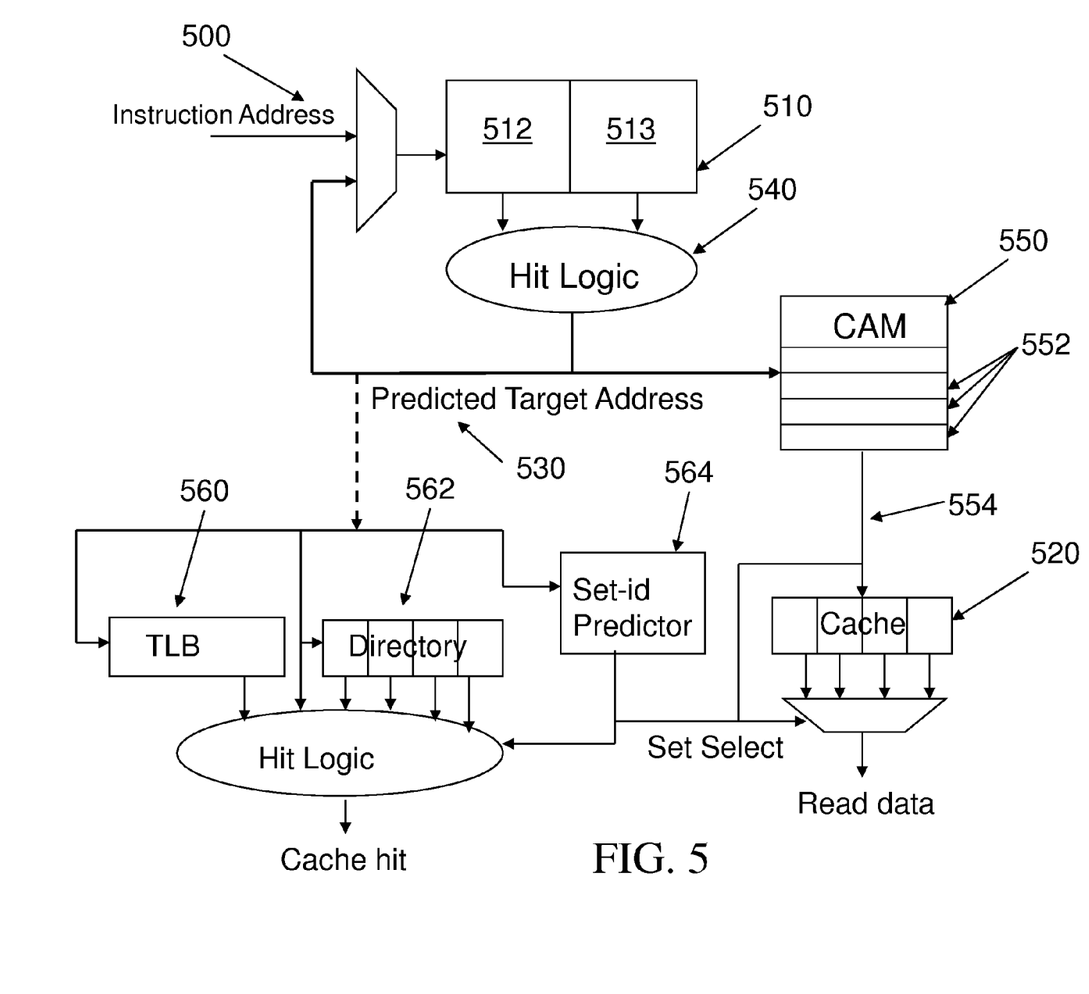
FIG. 5 depicts a block diagram of a system including a branch target buffer for selectively powering up a cache set of a multi-set associative cache in accordance with an embodiment.

Referring now to FIG. 5, a block diagram of a system 500 including a branch target buffer (BTB) 510 for selectively powering up a cache set of a multi-set associative cache 520 in accordance with an embodiment is shown.

The branch target buffer 510 is configured to receive an instruction address and search the one or more sets 512, 513 of the branch target buffer 510 for branches. Hit logic 540 receives predicted branch indications from the branch target buffer 510 and provides a predicted target for the predicted branch. The predicted target address 530 is sent to the CAM 550 and if the target address 530 corresponds to an entry 552 in the CAM 550, the CAM 550 will report that the content is in the cache 520 and which set of the cache 520 contains the data. Accordingly, only the set of the cache 520 that contains the instruction text needs to be powered up and this is the set that will be selected to read out the line that contains the instruction text. In addition, a directory 562, translation lookaside buffer 560 and set-ID predictor 564 do not have to be powered up for the cache access since the set to be selected is already known and is known to be valid in the cache as a cache "hit".

In exemplary embodiments, it takes one cycle or more, to transfer the predicted target address 530 to the instruction cache which is typically a relatively long distance away. Accordingly, the CAM 550 access can be done in parallel to this transfer and the result 554 from the CAM 550 (typically about 3 bits and significantly less bits than the predicted target address 530) can be sent on higher speed wire so as to arrive at the instruction cache around the same time as that of the predicted target address 530.

Figure 6:
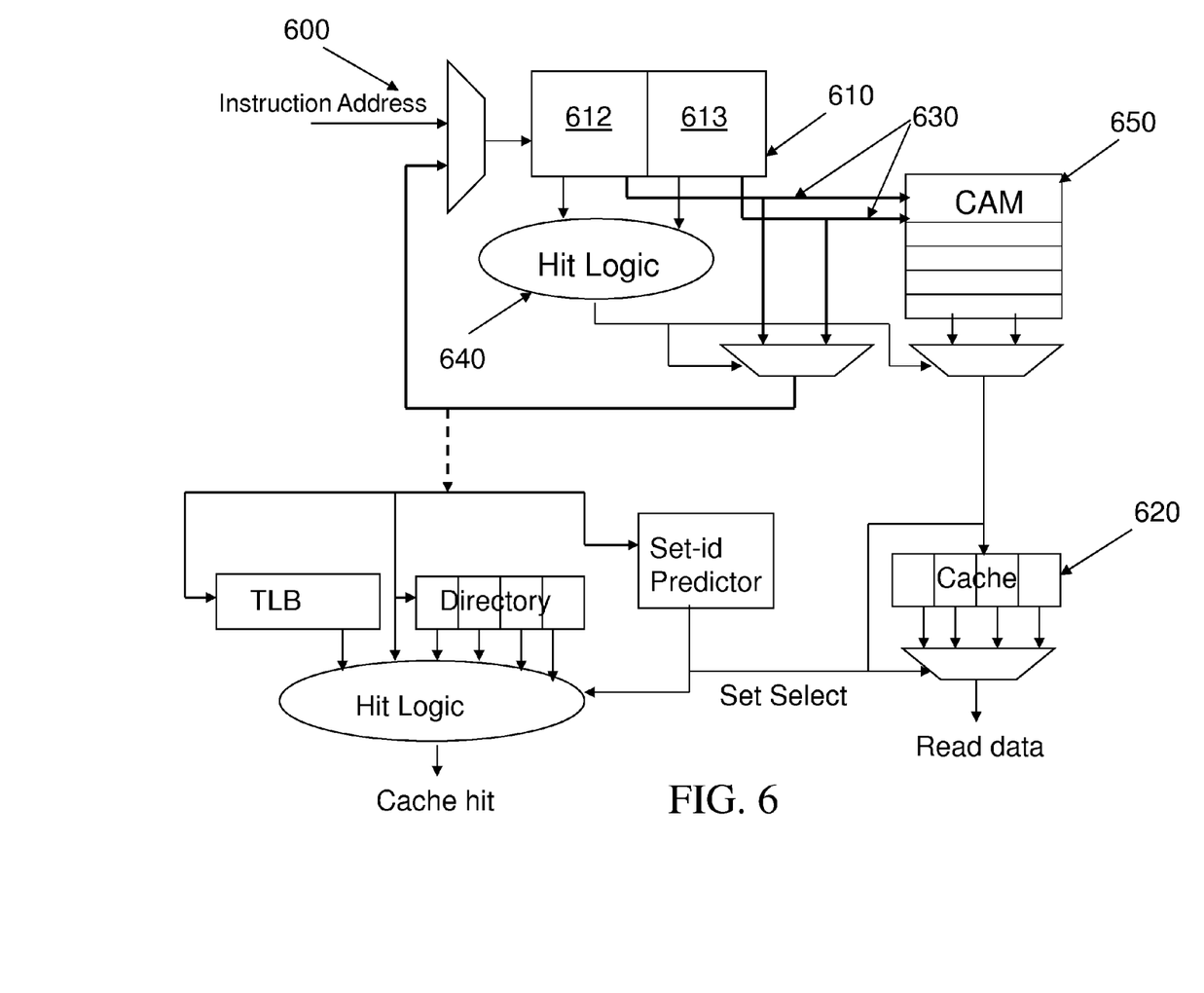
FIG. 6 depicts a block diagram of a system including a branch target buffer for selectively powering up a cache set of a multi-set associative cache in accordance with another embodiment.

Referring now to FIG. 6, a block diagram of a system 600 including a multi-set branch target buffer (BTB) 610 for selectively powering up a cache set of a multi-set associative cache 620 in accordance with an embodiment is shown. The branch target buffer 610 is configured to receive an instruction address and search the two or more sets 612, 613 of the branch target buffer 610 for branches. Prior to determining the set 612, 613 of the branch target buffer 610, if any, that contains the branch, the target address 630 from each set 612, 613 can be sent to the CAM 650. In this way, when multiplexing down the target from the set 612, 613 of interest, the result from the CAM 650 can also be multiplexed down in parallel. Accessing the CAM 650 with multiple addresses in parallel allows the CAM 650 accessing logic to be performed in parallel with the hit detect 640 such that the I-cache set selection from the CAM 650 can be sent to the I-cache 620 with lower latency as compared to awaiting to access the CAM 650 with the result of the hit logic 640.

For processors with a strong memory model, program store compare (PSC) (also known as self-modifying code) must be tracked by the hardware. In order to track the PSCs, the instruction cache lines active in the pipeline must be tracked. Accordingly, in exemplary embodiments, each entry in the CAM may also contain an instruction line address identification tag. Whenever the predicted target matches a line address in the CAM that has a valid instruction line address identification tag, the branch target will acquire the same instruction line address identification tag.

Figure 7:
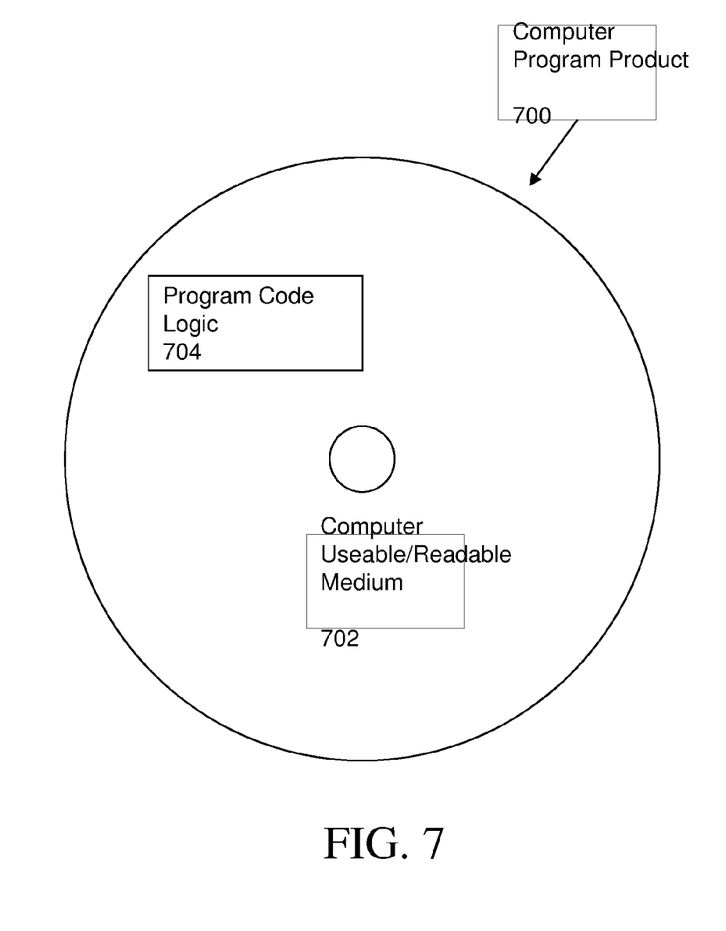
FIG. 7 illustrates a computer program product in accordance with an embodiment.

Referring now to FIG. 7, in one example, a computer program product 700 includes, for instance, one or more storage media 702, wherein the media may be tangible and/or non-transitory, to store computer readable program code means or logic 704 thereon to provide and facilitate one or more aspects of embodiments described herein.

Embodiments of the disclosure include a computer implemented method, computer program product and computer system for selectively powering up a cache set of a multi-set associative cache. The method includes receiving an instruction fetch address and determining that the instruction fetch address corresponds to one of a plurality of entries of a content addressable memory. Based on determining that the instruction fetch address corresponds to one of a plurality of entries of a content addressable memory a cache set of the multi-set associative cache that contains a cache line referenced by the instruction fetch address is identified and only powering up a subset of cache. Based on the identified cache set not being powered up, selectively powering up the identified cache set of the multi-set associative cache and transmitting one or more instructions stored in the cache line referenced by the instruction fetch address to a processor.

In an embodiment, determining that the instruction fetch address corresponds to one of a plurality of entries of a content addressable memory includes comparing the instruction fetch address to the plurality of entries of the content addressable memory. The determining also includes powering down a least recently used cache line of the subset, reading the powered up cache line referenced by the instruction fetch address, and selecting the one or more instructions to be transmitted from the powered up cache line.

In an embodiment, each of the plurality of entries corresponds to a recently accessed cache line.

In an embodiment, each of the plurality of entries includes an instruction address field, which includes the address of the recently accessed instruction cache line, a set field, which includes the cache set within the multi-set associative cache that contains the recently accessed instruction cache line and a valid bit field.

In an embodiment, each of the plurality of entries further comprises an instruction line address identification tag.

In an embodiment, the valid bit field of an entry is set to zero if the recently accessed instruction cache line is invalidated and the valid bit field of all of the plurality of entries of the content addressable memory are set to zero if states affecting all of the plurality of entries of the content addressable memory are altered.

In an embodiment, the method further includes based on determining that the instruction fetch address does not correspond to one of the plurality of recently accessed cache lines stored in the content addressable memory powering up each of the cache sets of the multi-set associative cache in parallel, reading the cache lines of each of the cache sets referenced by the instruction fetch address, selecting the cache line of a cache set based on the instruction fetch address, and transmitting a data stored in the cache line referenced by the instruction fetch address to a processor.

In an embodiment, the content addressable memory is configured to simultaneously receive a plurality of possible instruction fetch addresses, simultaneously compare the plurality of entries of the content addressable memory to the multiple possible instruction fetch addresses and based on the comparison, determine whether one of the plurality of possible instruction fetch address corresponds to one of the plurality of entries of the content addressable memory.

Technical effects and benefits include reducing the power consumption associated with accessing data stored in a multi-set associative cache by selectively identifying and powering up only the desired cache set.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for implementing selectively powering up a cache set of a multi-set associative cache, the computer program product comprising:
    a tangible storage medium readable by a processing circuit and storing instructions for execution by the processing circuit for performing a method comprising:
    receiving an instruction fetch address;
    based on determining that the instruction fetch address corresponds to one of a plurality of entries of a content addressable memory, identifying, by a computer, a cache set of the multi-set associative cache that contains a cache line referenced by the instruction fetch address, wherein only a subset of cache sets are powered up;
    based on the identified cache set not being powered up, selectively powering up the identified cache set of the multi-set associative cache;
    transmitting one or more instructions stored in the cache line referenced by the instruction fetch address to a processor,
    wherein each of the plurality of entries of the content addressable memory correspond to a recently accessed cache line and comprise an instruction address field that includes the address of the recently accessed instruction cache line and a set field that includes the cache set within the multi-set associative cache that contains the recently accessed instruction cache line, and
    based on determining that the instruction fetch address does not correspond to one of the plurality of recently accessed cache lines stored in the content addressable memory:
        powering up each of the cache sets of the multi-set associative cache in parallel;
        reading the cache lines of each of the cache sets referenced by the instruction fetch address;
        selecting the cache line of a cache set based on the instruction fetch address; and
        transmitting a data stored in the cache line referenced by the instruction fetch address to a processor.

2. The computer program product of claim 1, wherein the determining further comprises:
    comparing, by the computer, the instruction fetch address to the plurality of entries of the content addressable memory;
    powering down a least recently used cache line of the subset;
    reading the powered up cache line referenced by the instruction fetch address; and
    selecting the one or more instructions to be transmitted from the powered up cache line.

3. The computer program product of claim 1, wherein each of the plurality of entries further comprise
    a valid bit field.

4. The computer program product of claim 3, wherein the valid bit field of an entry is set to zero to indicate that the recently accessed instruction cache line is invalidated; and
    wherein the valid bit field of all of the plurality of entries of the content addressable memory are set to zero to indicate that states affecting all of the plurality of entries of the content addressable memory are altered.

5. The computer program product of claim 1, wherein the content addressable memory is configured to:
    simultaneously receive a plurality of possible instruction fetch addresses;
    simultaneously compare the plurality of entries of the content addressable memory to the multiple possible instruction fetch addresses; and
    based on the comparison, determine whether one of the plurality of possible instruction fetch address corresponds to one of the plurality of entries of the content addressable memory 6. A computer implemented method for selectively powering up a cache set of a multi-set associative cache, the method comprising:
    receiving an instruction fetch address;
    based on determining that the instruction fetch address corresponds to one of a plurality of entries of a content addressable memory, identifying, by a computer, a cache set of the multi-set associative cache that contains a cache line referenced by the instruction fetch address, wherein only a subset of cache sets are powered up;
    based on the identified cache set not being powered up, selectively powering up the identified cache set of the multi-set associative cache;
    transmitting one or more instructions stored in the cache line referenced by the instruction fetch address to a processor,
    wherein each of the plurality of entries of the content addressable memory correspond to a recently accessed cache line and comprise an instruction address field that includes the address of the recently accessed instruction cache line and a set field that includes the cache set within the multi-set associative cache that contains the recently accessed instruction cache line, and
    based on determining that the instruction fetch address does not correspond to one of the plurality of recently accessed cache lines stored in the content addressable memory:
        powering up each of the cache sets of the multi-set associative cache in parallel;
        reading the cache lines of each of the cache sets referenced by the instruction fetch address;
        selecting the cache line of a cache set based on the instruction fetch address; and
        transmitting a data stored in the cache line referenced by the instruction fetch address to a processor.

7. The computer implemented method of claim 6, wherein the determining further comprises:
    comparing, by the computer, the instruction fetch address to the plurality of entries of the content addressable memory;
    powering down a least recently used cache line of the subset;
    reading the powered up cache line referenced by the instruction fetch address; and
    selecting the one or more instructions to be transmitted from the powered up cache line.

8. The computer implemented method of claim 6, wherein each of the plurality of entries further comprise
    a valid bit field.

9. The computer implemented method of claim 8, wherein the valid bit field of an entry is set to zero to indicate that the recently accessed instruction cache line is invalidated; and
    wherein the valid bit field of all of the plurality of entries of the content addressable memory are set to zero to indicate that states affecting all of the plurality of entries of the content addressable memory are altered.

10. The computer implemented method of claim 6, wherein the content addressable memory is configured to:
   simultaneously receive a plurality of possible instruction fetch addresses;
   simultaneously compare the plurality of entries of the content addressable memory to the multiple possible instruction fetch addresses; and
   based on the comparison, determine whether one of the plurality of possible instruction fetch address corresponds to one of the plurality of entries of the content addressable memory.

11. A computer system for selectively powering up a cache set of a multi-set associative cache, the system comprising:
   a processor comprising the multi-set associative cache and a content addressable memory, the system configured to perform a method comprising:
   receiving an instruction fetch address;
   based on determining that the instruction fetch address corresponds to one of a plurality of entries of a content addressable memory, identifying, by a computer, a cache set of the multi-set associative cache that contains a cache line referenced by the instruction fetch address, wherein only a subset of cache sets are powered up;
   based on the identified cache set not being powered up, selectively powering up the identified cache set of the multi-set associative cache;
   transmitting one or more instructions stored in the cache line referenced by the instruction fetch address to a processor,
   wherein each of the plurality of entries of the content addressable memory correspond to a recently accessed cache line and comprise an instruction address field that includes the address of the recently accessed instruction cache line and a set field that includes the cache set within the multi-set associative cache that contains the recently accessed instruction cache line, and
   based on determining that the instruction fetch address does not correspond to one of the plurality of recently accessed cache lines stored in the content addressable memory:
   powering up each of the cache sets of the multi-set associative cache in parallel;
   reading the cache lines of each of the cache sets referenced by the instruction fetch address;
   selecting the cache line of a cache set based on the instruction fetch address; and
   transmitting a data stored in the cache line referenced by the instruction fetch address to a processor.

12. The computer system of claim 11, wherein the determining further comprises:
   comparing, by the computer, the instruction fetch address to the plurality of entries of the content addressable memory;
   powering down a least recently used cache line of the subset;
   reading the powered up cache line referenced by the instruction fetch address; and
   selecting the one or more instructions to be transmitted from the powered up cache line.

13. The computer system of claim 11, wherein each of the plurality of entries further comprises
   a valid bit field.

14. The computer system of claim 13, wherein the valid bit field of an entry is set to zero to indicate that the recently accessed instruction cache line is invalidated; and
   wherein the valid bit field of all of the plurality of entries of the content addressable memory are set to zero to indicate that states affecting all of the plurality of entries of the content addressable memory are altered.

15. The computer system of claim 11, wherein the content addressable memory is configured to:
   simultaneously receive a plurality of possible instruction fetch addresses;
   simultaneously compare the plurality of entries of the content addressable memory to the multiple possible instruction fetch addresses; and
   based on the comparison, determine whether one of the plurality of possible instruction fetch address corresponds to one of the plurality of entries of the content addressable memory.

* * * * *